UNITED STATES PATENT OFFICE.

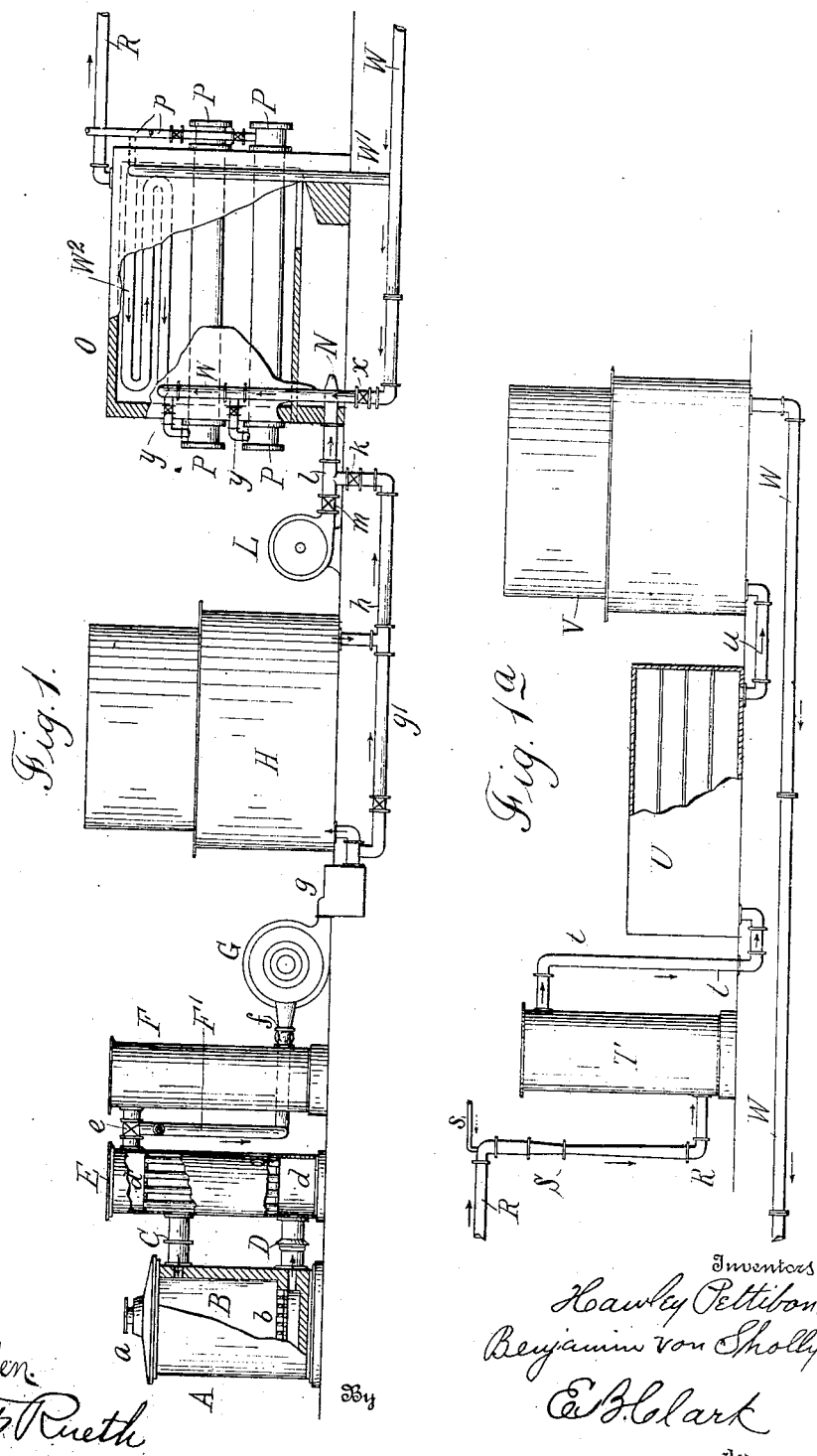

HAWLEY PETTIBONE, OF NEW ROCHELLE, AND BENJAMIN von SHOLLY, OF FLUSHING, NEW YORK.

PROCESS OF MANUFACTURING NITROGEN COMPOUNDS.

1,042,141.  Specification of Letters Patent.  Patented Oct. 22, 1912.

Application filed August 19, 1908. Serial No. 449,310.

*To all whom it may concern:*

Be it known that we, HAWLEY PETTIBONE, residing at New Rochelle, in the county of Westchester, State of New York, and BENJAMIN VON SHOLLY, residing at Flushing, in the county of Queens and State of New York, citizens of the United States, have invented certain new and useful Improvements in Processes of Manufacturing Nitrogen Compounds, of which the following is a specification.

The object of our invention is to provide an economical and effective method of manufacturing cyanamid and other nitrogen compounds, and at the same time utilize a by-product in the nature of spent gas, after the heat units have been utilized for production of heat or power.

A special object of our invention is to provide for the production and utilization of cheap nitrogen in the manufacture of cyanamid, whereby great economy is effected in obtaining the product.

The matter constituting our invention will be defined in the claims.

We will now describe our process and one form of apparatus for carrying it out, by reference to the accompanying drawings, in which—

Figures 1 and 1ª represent diagrammatically, partly in elevation and partly in section, our apparatus.

We preferably use a Loomis Pettibone down-draft gas generator A, having a top fuel opening and tight fitting lid $a$, a fuel chamber B, grate $b$ and the usual ash-pit. A hot air supply pipe C connects the hot air chamber of a tubular air-heater or economizer E with the top of the generator, and a gas-outlet pipe D connects the ash-pit with the lower gas chamber $d$ of the heater. A gas-scrubber F is connected by a pipe and valve $e$ with the upper gas chamber $d'$ and at its lower end is connected by pipe $f$ with a combined exhaust fan and centrifugal extractor G. A pipe F' having a valve, may lead from gas chamber $d'$ directly to the fan and extractor in case the scrubber is not required. The exhaust fan and extractor deliver the gas by pipe $g$ into a small holder H, or by a by-pass pipe $g'$, having a valve, directly to the inlet pipe of a burner N in the retort furnace. An outlet pipe $h$, having a valve $k$, connects the holder with a T coupling $l$ which connects by pipe $n$ with a burner N in the furnace O. An air-blower L connects by its discharge pipe and valve $m$ with the T coupler $l$ leading to the burner N. Any good gas and air mixing burner, producing perfect combustion, can be used.

In the furnace O are placed the combining retorts P, preferably through retorts, having mouth-pieces at each end, of which four may be conveniently used. A take-off pipe R for products of combustion connects with the top of the furnace and with a jet exhauster S (see Fig. 1ª), having a fluid supply pipe $s$ and thence continuing connects with the base of a scrubber T, which may be a spray-scrubber, and a pipe $t$ leads from the top of the scrubber into the bottom of the purifier U which may be charged with lime or other material for removing carbonic acid and sulfur compounds from the gaseous products. Any purifying material best adapted for the purpose will be used, also any desired kind of purifying apparatus.

An outlet pipe $u$ connects the purifier with a holder V for nitrogen gas. A pipe W leads from the holder and connects with the retorts by branch pipes and valves $y$ connecting with the mouth-pieces. We preferably connect a branch pipe W' with pipe W and pass it into furnace O and there connect it with a recuperative device, such as heating coil $W^2$, located in the top above the retorts as shown, or other convenient part of the furnace. This coil connects with the delivery end of pipe W and the latter is provided with a shut-off valve $x$ for directing the gas through the heating coil. The outlet pipes $p$ connecting with the mouth-pieces at the other ends of the retorts may also be connected with the coil as indicated by dotted lines, or with a separate heater, so that nitrogen gas may be heated and circulated through the retorts and heater for maintaining the desired temperature of the material undergoing treatment.

The jet exhauster S will, in practice, be an automatic regulating jet exhauster, which will tend to maintain a slightly diminished pressure in the fire chamber and force the gaseous products through the scrubber and purifier into the second gas holder V.

The operation of making cyanamid is very simple and may be conducted as follows: Fire is kindled in the generator and a good producer gas generated from liquid or solid carbonaceous fuel and delivered by the centrifugal extractor and fan G into holder H. In the operation of the exhaust fan G air will be drawn through the heating chamber E into the generator, and hot gas will be drawn from the generator through the tubes of the heater, thereby heating the air circulated around the tubes. The gas is also drawn through the scrubber F where it is freed from ash and cinder. The producer gas stored in the holder H may be composed, approximately, of the following constituents:—

| | |
|---|---|
| $CO_2$ | 3.5 |
| $O_2$ | .2 |
| $CO$ | 26.0 |
| $CHy$ | 1.3 |
| $H_2$ | 9.0 |
| $N_2$ | 60.0 |
| | 100.0 |

($H_2S$ traces, $SO_2$ traces, water vapor.)

A store of gas having been accumulated, it is admitted to the burner N, together with a regulated air supply, and ignited, the proportions of gas and air being regulated to produce perfect combustion without material excess of either gas or air in the chamber around the retorts P. The resulting products of combustion are substantially free of both air and unburnt gas, containing approximately the following constituents:—

| | |
|---|---|
| $CO_2$ | 16.3 |
| $O$ | 0.2 |
| $CO$ | 0.5 |
| $N$ | 83.0 |
| $H_2O$ | trace |
| $SO_2$ | traces. |

The jet exhauster, being in operation, will draw the products of combustion from the combustion chamber of furnace O and deliver them into scrubber T from which they will then pass through the purifier U where carbon dioxid and sulfur compounds will be absorbed by the purifying material. The purified gas, consisting of nitrogen, 99.3 per cent. and other gases, seven tenths of one per cent., is stored in the holder V, from which it is supplied to the retorts as required.

The retorts being heated a red heat, approximately 800° C., are charged with carbids and halogen salts, mixed in suitable proportions, introduced at the rear ends, and the lids tightly closed. The carbids and halogen salts being heated to the proper temperature, the valves $y$ are opened, admitting nitrogen which has been pre-heated in the coil $W^2$, and which passing in contact with the red hot charge causes a chemical reaction to take place between it and the carbid mixture which is expressed by the following equation, using calcium carbid as an example:

$$CaC_2 + N_2 = CaNCN + C.$$

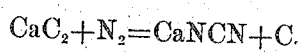

The result of the reaction is a complete conversion of the carbid into cyanamids and carbon. The conversion being completed, the nitrogen is shut off, the charge drawn from the retorts, cooled in an atmosphere of our cool nitrogen gas, and a fresh charge of carbid mixture introduced and the process repeated.

Operating in the described manner, the source of heat for the retorts also furnishes the nitrogen which is necessary and furnishes it so cheaply that a continuous stream of the substantially pure nitrogen gas can be run through the retort, maintaining a maximum richness in nitrogen of the atmosphere therein. Both the nitrogen of the producer gas and the nitrogen of the air used to burn it are utilized, as well as the heat of combustion. In the refractory-walled space around the retorts, by the exercise of some care the producer gas may be burned with the exact quantity of air needed for combustion, furnishing an effluent which is, as shown by the cited analysis, substantially entirely composed of carbon dioxid and nitrogen. Upon removal of the former, substantially pure nitrogen is left. In the cyanamid reaction this pure gas is very desirable since if either carbon dioxid or carbon monoxid be present in substantial amount wasteful side-reactions occur. In other words, in operating in the described manner both the necessary heat and the necessary nitrogen are attained together.

Among the advantages of our process of producing cyanamids are the following:— A cheap and rapid method of producing substantially pure nitrogen and utilizing, for its production, the waste products of a previous operation used in the process.

By using gas for heating the retorts, we are enabled to maintain any required temperature, and uniformly heat the retorts throughout their entire lengths. It also permits of an intimate admixture of a suitable proportion of air with the gas to effect complete combustion without using any excess of oxygen, so that the products of combustion will contain the maximum percentage of nitrogen. This result cannot be attained with other forms of fuel.

We also have the advantage of quickness, convenience and cleanliness of operation.

Our process may be modified by consuming the gas from the generator in an internal combustion engine, which is used for operating a dynamo to generating electric current, this current being used to produce an arc for the manufacture of carbid. The exhaust gaseous products from the engine will be cleaned, and purified and the resulting nitrogen stored in a holder, and passed, as required through the carbid during its production.

Though horizontal retorts are shown we may use vertical or inclined retorts for more expeditious charging and drawing.

Our invention is not confined to the details of construction and operation above set forth, and these may be varied without departing from the spirit of our invention.

By means of our cheaply produced nitrogen, we also manufacture cyanids, by use of the proper materials, temperature and manipulation of the apparatus.

Having described our invention, what we claim as new and desire to secure by Letters Patent, is—

1. The process of making nitrogen compounds which comprises heating a substance able to take up nitrogen in a retort, by burning producer gas with substantially the theoretical amount of air around said retort to furnish the heat, removing carbon dioxid from the product of combustion to furnish nitrogen and transmitting said freed nitrogen to the interior of the retort to combine with said substance.

2. The process of making a nitrogen compound which comprises heating calcium carbid in a retort, by burning producer gas with substantially the theoretical amount of air around said retort to furnish the heat, removing carbon dioxid from the product of combustion to furnish nitrogen and transmitting said freed nitrogen to the interior of the retort in contact with said carbid.

3. The process of making a nitrogen compound which comprises heating a substance able to take up nitrogen in a retort, by burning producer gas with substantially the theoretical amount of air around the retort to furnish the heat, removing carbon dioxid from the product of combustion to furnish nitrogen, reheating the freed nitrogen and transmitting it to the interior of the retort in contact with said substance.

4. The process of making a nitrogen compound which comprises heating calcium carbid in a retort, by burning producer gas with substantially the theoretical amount of air around the retort to furnish the heat, removing carbon dioxid from the product of combustion to furnish freed nitrogen, reheating the nitrogen and transmitting it to the interior of the retort in contact with said carbid.

5. The process of making cyanamid which comprises heating calcium carbid in a retort with the aid of producer gas burning therearound with substantially the theoretical amount of air, passing the products of combustion in contact with lime to remove carbon dioxid and furnish substantially pure nitrogen and returning such freed nitrogen to the interior of the retort to react with such carbid.

6. The process of producing nitrogen compounds, which consists in simultaneously utilizing the heat and nitrogen resulting from the combustion of a gaseous fuel in connection with a reacting substance, such as calcium carbid, by first burning the fuel gas for highly heating the reacting substance, then separating the nitrogen from the resulting product and passing such free nitrogen in contact with the heated reacting substance.

In testimony whereof we affix our signatures in presence of two witnesses.

HAWLEY PETTIBONE.
BENJAMIN von SHOLLY.

Witnesses:
W. R. FULLER,
H. A. KIMBER.